(12) United States Patent
Cain (10) Patent No.: US 6,928,483 B1
(45) Date of Patent: Aug. 9, 2005

(54) FAST PATH FORWARDING OF LINK STATE ADVERTISEMENTS

(75) Inventor: Bradley Cain, Cambridge, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/458,402

(22) Filed: Dec. 10, 1999

(51) Int. Cl.$^7$ .............................................. G06F 15/173
(52) U.S. Cl. ....................... 709/238; 709/238; 709/239; 709/240; 709/241; 370/351
(58) Field of Search ................................. 709/238, 239, 709/240, 241, 236, 237; 370/351

(56) References Cited

U.S. PATENT DOCUMENTS

| | | | | | |
|---|---|---|---|---|---|
| 4,864,559 | A | * | 9/1989 | Perlman | 370/60 |
| 5,079,767 | A | * | 1/1992 | Perlman | 370/94.3 |
| 5,251,205 | A | * | 10/1993 | Callon et al. | 370/60 |
| 5,361,256 | A | * | 11/1994 | Doeringer et al. | 370/60 |
| 5,825,772 | A | * | 10/1998 | Dobbins et al. | 370/396 |
| 5,917,820 | A | * | 6/1999 | Rekhter | 370/392 |
| 6,049,524 | A | * | 4/2000 | Fukushima et al. | 370/220 |
| 6,078,963 | A | * | 6/2000 | Civanlar et al. | 709/238 |
| 6,252,856 | B1 | * | 6/2001 | Zhang | 370/254 |
| 2002/0091844 | A1 | * | 7/2002 | Craft et al. | 709/230 |

OTHER PUBLICATIONS www.faqs.org, D. Waitzman et al, RFC 1075, Nov. 1998.*
www.faqs.org, J. Moy, RFC 1584, Mar. 1994.*

* cited by examiner

*Primary Examiner*—Rupal Dharia
*Assistant Examiner*—Adnan M Mirza
(74) *Attorney, Agent, or Firm*—Steubing McGuinness & Manaras LLP (57) ABSTRACT

A link state advertisement protocol message received from an originating device over an inbound interface is forwarded over the fast path according to a predetermined forwarding scheme. A forwarding state that defines rules for forwarding the link state advertisement protocol message may be installed in a forwarding table, in which case the link state advertisement protocol message is forwarded over the fast path according to the forwarding state. The forwarding state may indicate the preferred inbound interface and/or the outbound interface(s) for forwarding the link state advertisement protocol message over the fast path. The link state advertisement protocol message continues to be processed and forwarded by the control plane as usual for robustness.

26 Claims, 8 Drawing Sheets

FAST PATH FORWARDING OF LINK STATE ADVERTISEMENTS

CROSS-REFERENCE TO RELATED APPLICATIONS

The present invention may be related to the following commonly-owned United States patent applications, which are hereby incorporated by reference in their entireties:

U.S. patent application Ser. No. 09/458,403 entitled FAST PATH FORWARDING OF LINK STATE ADVERTISEMENTS USING REVERSE PATH FORWARDING, filed on even date herewith in the name of Bradley Cain;

U.S. patent application Ser. No. 09/460,321 entitled FAST PATH FORWARDING OF LINK STATE ADVERTISEMENTS USING A MINIMUM SPANNING TREE, filed on even date herewith in the name of Bradley Cain; and U.S. patent application Ser. No. 09/460,341 entitled FAST PATH FORWARDING OF LINK STATE ADVERTISEMENTS USING MULTICAST ADDRESSING, filed on even date herewith in the name of Bradley Cain.

FIELD OF THE INVENTION

The present invention relates generally to communication systems, and more particulary to propagating link state advertisements in a communication network.

BACKGROUND OF THE INVENTION

In today's information age, it is typical for computers to be internetworked over a communication network. A common networking model uses a number of interconnected routers to route protocol messages (referred to hereinafter as packets) within the communication network. A router acts as a gateway between two or more network segments, and processes packets according to addressing information contained in the packets.

When a router receives a packet from a particular network segment, the router determines whether to drop the packet, process the packet, or forward the packet. Specifically, the router may drop the packet if the packet is destined for the same network segment from which it was received. The router may forward the packet if the packet is destined for a different network segment. The router may process the packet if the packet is destined for the router itself. For convenience, the router logic that forwards packets is referred to as the "fast path" of the router, while the router logic that processes packets is referred to as the "control plane" of the router.

In order for the fast path to forward packets, the router uses a routing protocol to determine network routes, and uses the network routes to build and maintain a forwarding table. The forwarding table includes forwarding entries mapping each destination address to a corresponding router interface based upon the network routes.

There are many different routing protocols in common use. One type of routing protocol, known as a "link state" routing protocol, an example of which is the Open Shortest Path First (OSPF) routing protocol, requires each router in the communication network to maintain a topology database describing the topology of the communication network. The topology database identifies each router in the communication network and the status of each router's links to other routers. Each router uses the topology information from its topology database to determine the network routes, typically using a shortest-path first technique for determining the network routes. The topology information, and therefore the forwarding table, is updated as network routes change.

In order for each router to maintain a topology database, each router must receive link state information from each of the other routers in the communication network. Therefore, each router sends link state advertisement (LSA) protocol messages to the other routers in the communication network indicating the status of each communication link maintained by the router. Typically, each router sends a LSA protocol message whenever the status of a communication link changes, and also sends a LSA protocol message periodically so that new routers receive the link state information in a timely manner. The LSA protocol messages are propagated to each of the other routers in the communication network.

When a router receives a LSA protocol message, the LSA protocol message is processed by the control plane of the router. The control plane updates the topology database according to the link state information in the LSA protocol message, and updates the forwarding table accordingly. The control plane may also forward the LSA protocol message to its neighboring routers.

Unfortunately, this control plane processing by each router can cause significant delay in propagating the LSA protocol messages to all routers in the communication network, especially in large communication networks having many routers. Consequently, there can be significant delay in recovering from network routing changes and outages, resulting in mis-routed packets, dropped packets, and overall performance degradation.

Thus, an improved technique for propagating LSA protocol messages is needed.

SUMMARY OF THE INVENTION

In accordance with one aspect of the invention, LSA protocol messages are forwarded over the fast path according to a predetermined forwarding scheme. This allows the LSA protocol messages to be propagated without the delays associated with the control plane. The LSA protocol messages are preferably also processed and forwarded by the control plane as usual for robustness.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

An embodiment of the present invention forwards LSA protocol messages by the fast path according to a predetermined forwarding scheme. This fast path forwarding of LSA protocol messages is done independently of any control plane processing, and therefore avoids the delays caused by the control plane processing. The fast path continues to route all received LSA protocol messages to the control plane as usual so that the control plane can obtain the topology information from the LSA protocol messages. Also, the control plane preferably forwards the LSA protocol messages as usual for robustness.

Figure 1:
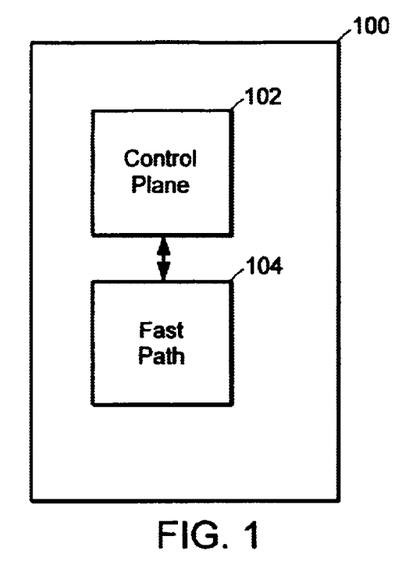
FIG. 1 is a block diagram showing the relevant logic blocks of an exemplary router in accordance with an embodiment of the present invention.

FIG. 1 is a block diagram showing the relevant logic blocks of an exemplary router 100. Among other things, the router includes a control plane 102 and a fast path 104. The fast path 104 performs filtering and forwarding of protocol messages, and routes control messages to the control plane 102. The control plane 102 processes control messages received from the fast path 104, and also sends protocol messages via the fast path 104.

Figure 2:
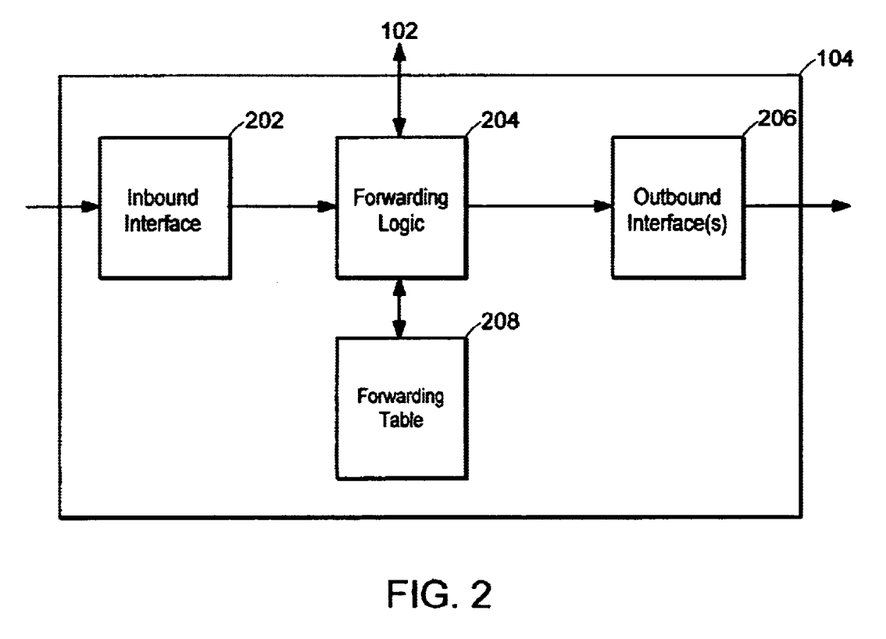
FIG. 2 is a block diagram showing the relevant logic blocks of the fast path in accordance with an embodiment of the present invention.

FIG. 2 is a block diagram showing the relevant logic blocks of the fast path 104. Among other things, the fast path 104 includes an inbound interface 202, forwarding logic 204, outbound interface(s) 206, and a forwarding table 208. The forwarding logic 104 performs packet filtering and forwarding functions based upon, among other things, the forwarding entries in the forwarding table 208. Specifically, upon receiving a packet from the inbound interface 202, the forwarding logic 204 may drop the packet, route the packet to the control plane 102, or forward the packet to the outbound interface(s) 206. Also, upon receiving a packet from the control plane 102, the forwarding logic may forward the packet to the outbound interface(s) 206.

Figure 3:
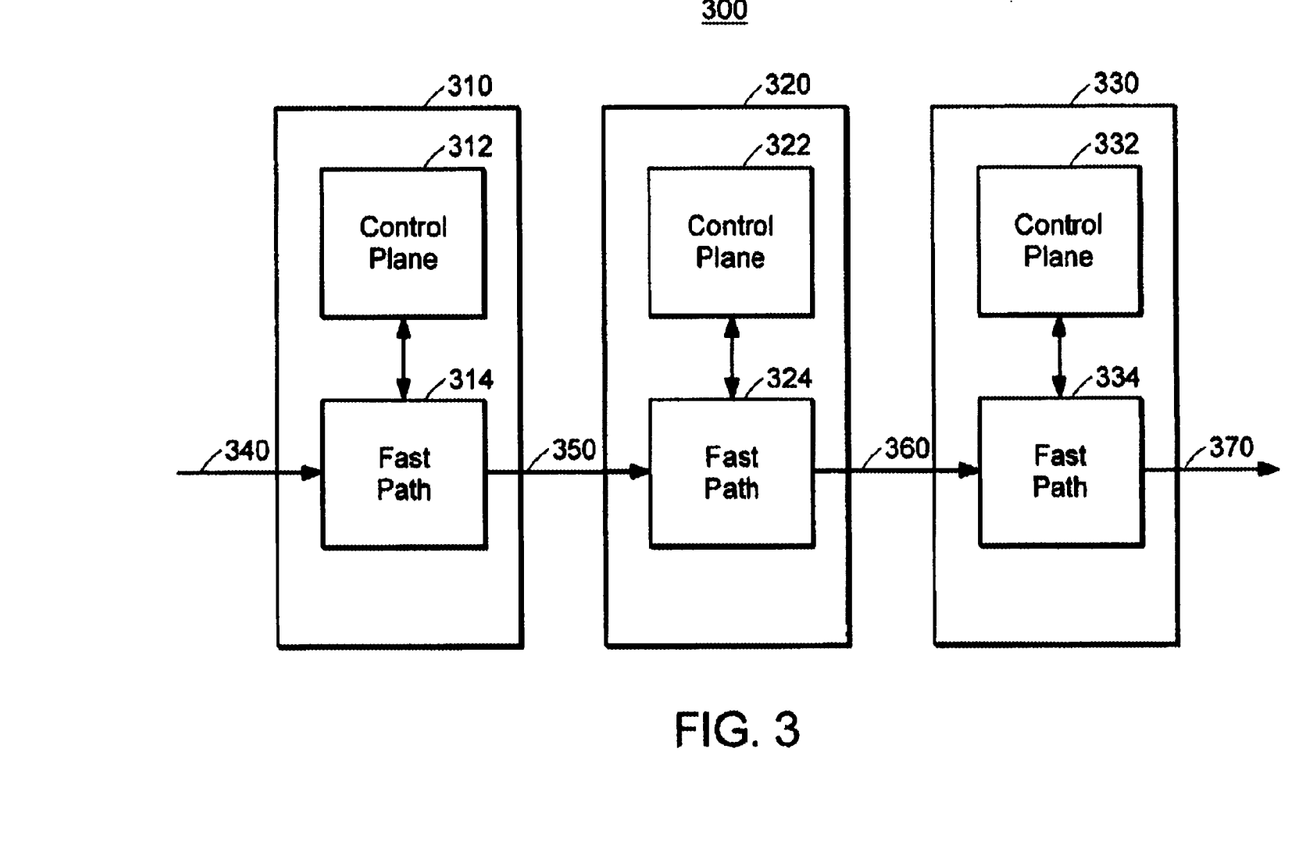
FIG. 3 is a block diagram showing an exemplary communication network in accordance with an embodiment of the present invention.

FIG. 3 is a block diagram showing an exemplary communication network 300 including three (3) interconnected routers, namely router 310, router 320, and router 330. Each router includes a control plane (312, 322, 332) and a fast path (314, 324, 334). Each router is connected to its neighboring router(s) via a fast path connection (340, 350, 360, 370).

Figure 4:
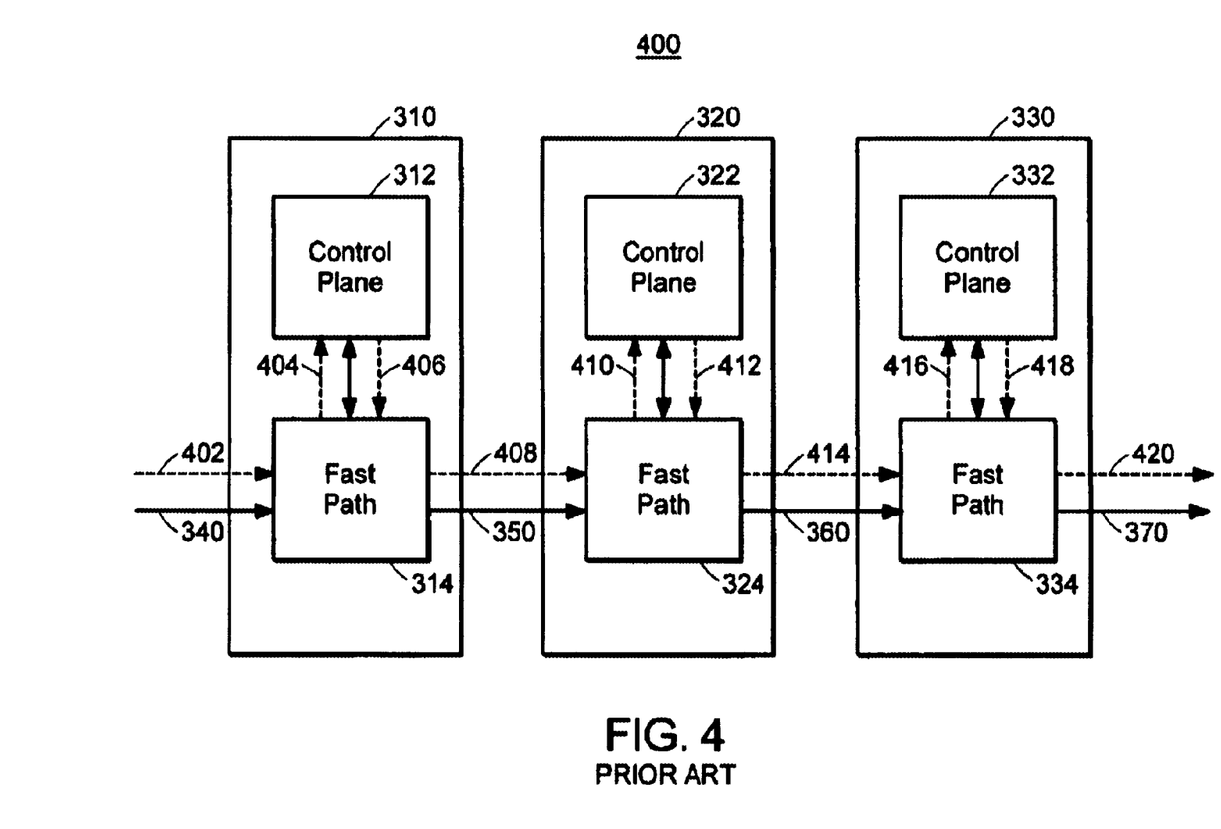
FIG. 4 is a block diagram showing the routing path of a link state advertisement protocol message in accordance with a prior art embodiment.

FIG. 4 shows the routing path of a LSA protocol message in an exemplary communication network 400 including the three (3) interconnected routers 310, 320, and 330. The LSA protocol message is propagated to all routers. Specifically, each router forwards the LSA protocol message to its neighboring router(s). Thus, the router 310 receives the LSA protocol message from its neighboring router, and forwards the LSA protocol message to the router 320. The router 320 receives the LSA protocol message from the router 310, and forwards the LSA protocol message to the router 330. The router 330 receives the LSA protocol message from the router 320, and forwards the LSA protocol message to its neighboring router.

More specifically, upon receiving the LSA protocol message by the router 310 over the routing path 402, the fast path 314, and particularly the forwarding logic of the fast path 314, routes the LSA protocol message to the control plane 312 over the routing path 404. The control plane 312 processes the LSA protocol message. Assuming the control plane 312 decides to forward the LSA protocol message, the control plane 312 forwards the LSA protocol message to the fast path 314 over the routing path 406. The fast path 314, and particularly the forwarding logic of the fast path 314, forwards the LSA protocol message to the router 320 over the routing path 408.

Upon receiving the LSA protocol message by the router 320 over the routing path 408, the fast path 324, and particularly the forwarding logic of the fast path 324, routes the LSA protocol message to the control plane 322 over the routing path 410. The control plane 322 processes the LSA protocol message. Assuming the control plane 322 decides to forward the LSA protocol message, the control plane 322 forwards the LSA protocol message to the fast path 324 over the routing path 412. The fast path 324, and particularly the forwarding logic of the fast path 324, forwards the LSA protocol message to the router 330 over the routing path 414.

Upon receiving the LSA protocol message by the router 330 over the routing path 414, the fast path 334, and particularly the forwarding logic of the fast path 334, routes the LSA protocol message to the control plane 332 over the routing path 416. The control plane 332 processes the LSA protocol message. Assuming the control plane 332 decides to forward the LSA protocol message, the control plane 332 forwards the LSA protocol message to the fast path 334 over the routing path 418. The fast path 334, and particularly the forwarding logic of the fast path 334, forwards the LSA protocol message to its neighboring router(s) over the routing path 420.

The process of routing the LSA protocol message to the control plane and forwarding LSA protocol message by the control plane, in and of itself, causes delays in propagating the LSA protocol message to all routers in the communication network. The amount of processing performed by the control plane only worsens the delays in propagating the LSA protocol message to all routers in the communication network. The amount of processing performed by the control plane can be significant, depending on the routing protocol and certain operational parameters. For example, the control plane processing for an OSPF LSA protocol message includes, among other things, verifying an Internet Protocol (IP) checksum for the LSA protocol message, verifying an OSPF checksum for the LSA protocol message, determining whether the LSA protocol message is intended for the router, determining whether the LSA protocol message is received for the correct network area, determining whether the LSA protocol message is a duplicate of a previously received LSA protocol message, determining whether the LSA protocol message has reached its maximum age, determining outbound interface(s), and determining the status of neighboring routers. When authentication is enabled, the control plane processing for an OSPF LSA protocol message also includes authenticating the LSA protocol message using a MD5 one-way hash function calculation, which adds even more delays in propagating the LSA protocol message to all routers in the communication network.

Therefore, in a preferred embodiment of the present invention, LSA protocol messages are forwarded by the routers over the fast path.

Figure 5:
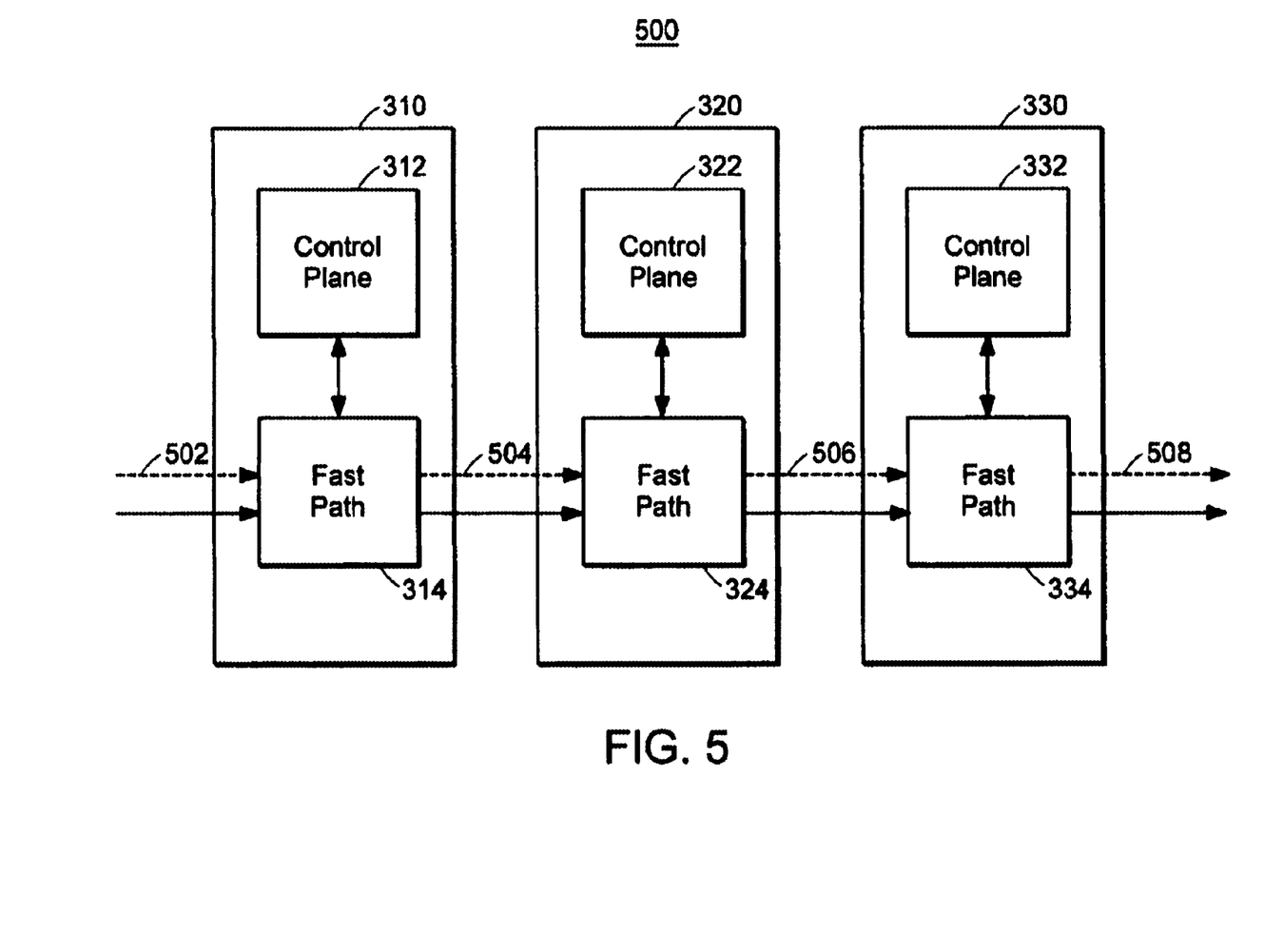
FIG. 5 is a block diagram showing the routing path of a link state advertisement protocol message in accordance with an embodiment of the present invention.

FIG. 5 shows the routing path of a LSA protocol message in an exemplary communication network 500 including the three (3) interconnected routers 310, 320, and 330. The LSA protocol message is propagated to all routers. Specifically, each router forwards the LSA protocol message to its neighboring router(s). Thus, upon receiving the LSA protocol message by the router 310 over the routing path 502, the fast path 314, and particularly the forwarding logic of the fast path 314, routes the LSA protocol message to the router 320 over the routing path 504. Upon receiving the LSA protocol message by the router 320 over the routing path 504, the fast path 324, and particularly the forwarding logic of the fast path 324, routes the LSA protocol message to the router 330 over the routing path 506. Upon receiving the LSA protocol message by the router 330 over the routing path 506, the fast path 334, and particularly the forwarding logic of the fast path 334, routes the LSA protocol message to its neighboring router(s) over the routing path 508.

Figure 6:
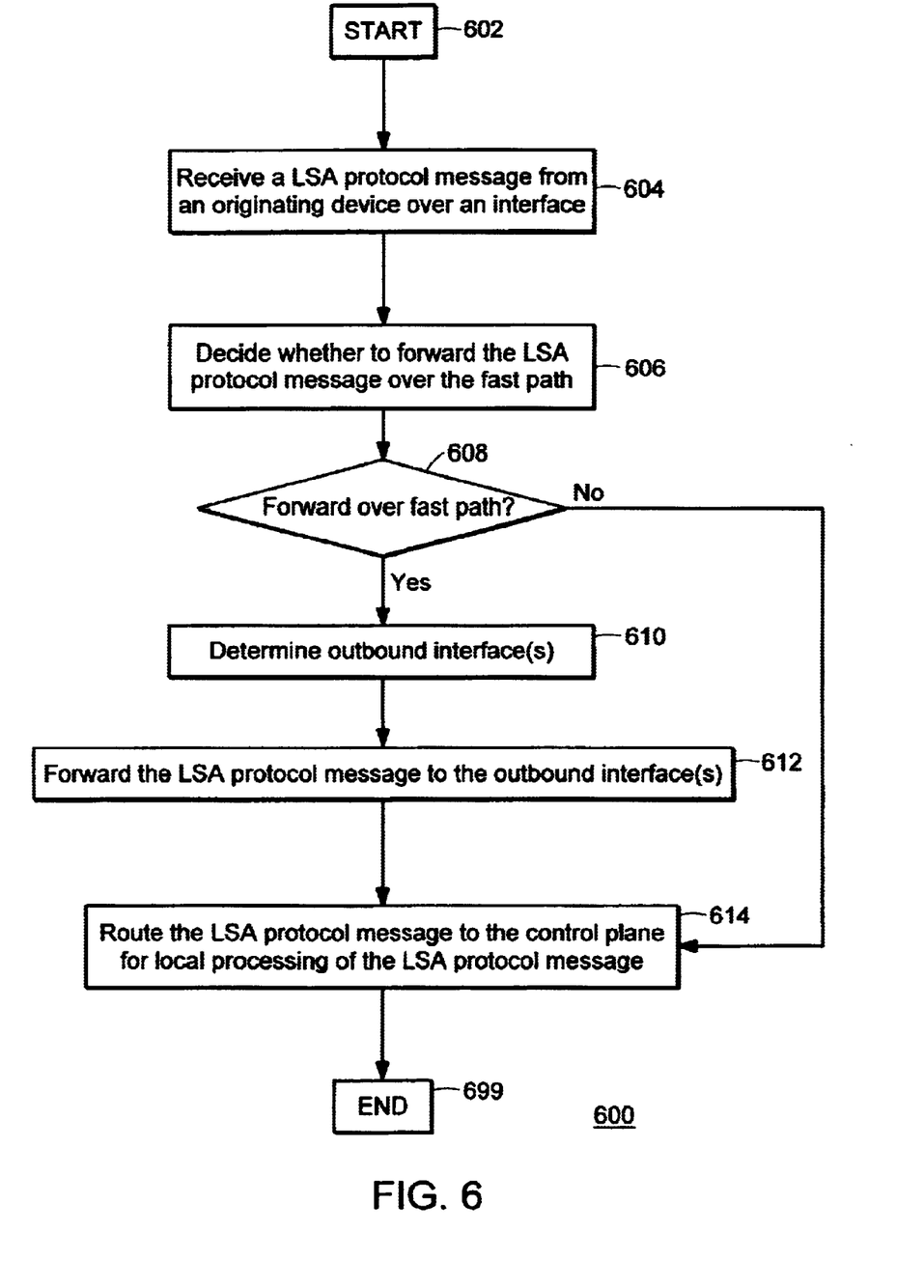
FIG. 6 is a logic flow diagram showing exemplary logic for processing a LSA protocol message in accordance with an embodiment of the present invention.

FIG. 6 is a logic flow diagram showing exemplary logic 600 for processing a LSA protocol message. Beginning at step 602, and upon receiving a LSA protocol message from an originating device over an interface, in step 604, the logic decides whether to forward the LSA protocol message over the fast path, in step 606. For example, the logic may decide to forward the LSA protocol message if and only if the interface is a preferred inbound interface for receiving LSA protocol messages from the originating device. If the logic decides to forward the LSA protocol message over the fast path (YES in step 608), then the logic determines the outbound interface(s), in step 610, and forwards the LSA protocol message to the outbound interface(s), in step 612. Whether or not the logic forwards the LSA protocol message over the fast path, the logic routes the LSA protocol message to the control plane for local processing of the LSA protocol message, in step 614. The logic 600 terminates in step 699.

An embodiment of the present invention utilizes a predetermined forwarding scheme to forward the LSA protocol message over the fast path. Any of a number of forwarding schemes may be employed to forwarding LSA protocol messages by the fast path.

One exemplary fast path forwarding scheme employs "flooding" for forwarding LSA protocol messages, similar to the "flooding" scheme that is typically employed for control plane forwarding of LSA protocol messages. In such a fast path forwarding scheme, the fast path forwards the LSA protocol message to all interfaces, other than the interface from which the LSA protocol message was received.

Figure 7:
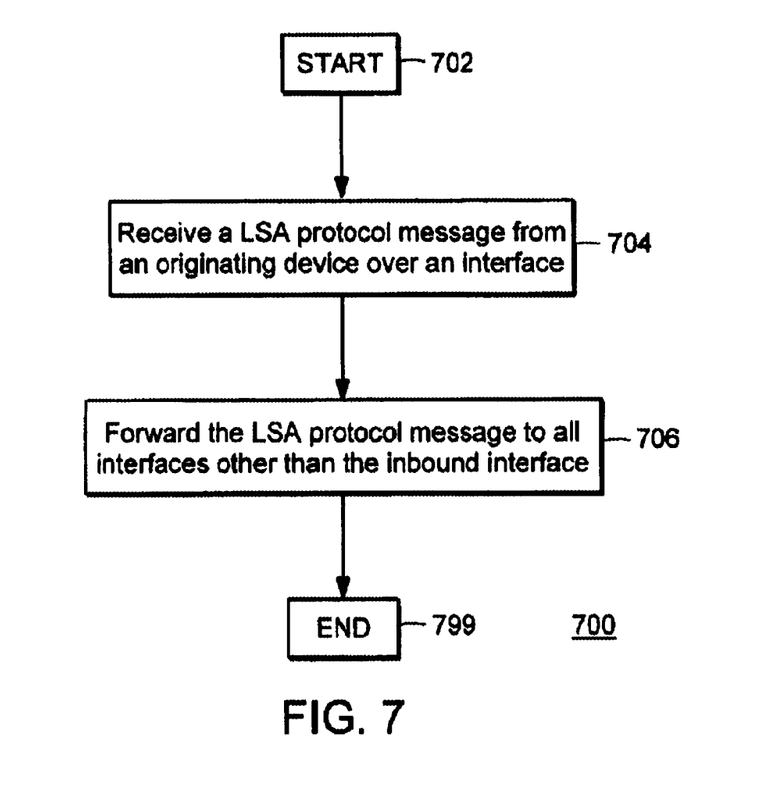
FIG. 7 is a logic flow diagram showing exemplary logic for forwarding a LSA protocol message using a "flooding" scheme in accordance with an embodiment of the present invention.

FIG. 7 shows exemplary logic 700 for forwarding LSA protocol messages by the fast path using a "flooding" scheme. Beginning at step 702, and upon receiving a LSA protocol message from an originating device over an interface, in step 704, the logic forwards the LSA protocol message to all interfaces other than the inbound interface, in step 706. The logic 700 terminates in step 799.

Another exemplary fast path forwarding scheme employs multicasting techniques for forwarding LSA protocol messages. In such a fast path forwarding scheme, the problem of propagating LSA protocol messages is treated as a multicast distribution problem, where the originating device is the multicast source and all other routers are members of the multicast group. Any of a number of multicast forwarding schemes may be employed to forwarding LSA protocol messages by the fast path. For example, the related application entitled FAST PATH FORWARDING OF LINK STATE ADVERTISEMENTS USING REVERSE PATH FORWARDING, which was incorporated by reference above, describes the use of a reverse path forwarding scheme for forwarding LSA protocol messages by the fast path. The related application entitled FAST PATH FORWARDING OF LINK STATE ADVERTISEMENTS USING A MINIMUM SPANNING TREE, which was incorporated by reference above, describes the use of a minimum spanning tree for forwarding LSA protocol messages by the fast path. The related application entitled FAST PATH FORWARDING OF LINK STATE ADVERTISEMENTS USING MULTICAST ADDRESSING, which was incorporated by reference above, describes the use of multicast addressing for forwarding LSA protocol messages by the fast path. Other multicast forwarding schemes may be employed for forwarding LSA protocol messages by the fast path.

Figure 8:
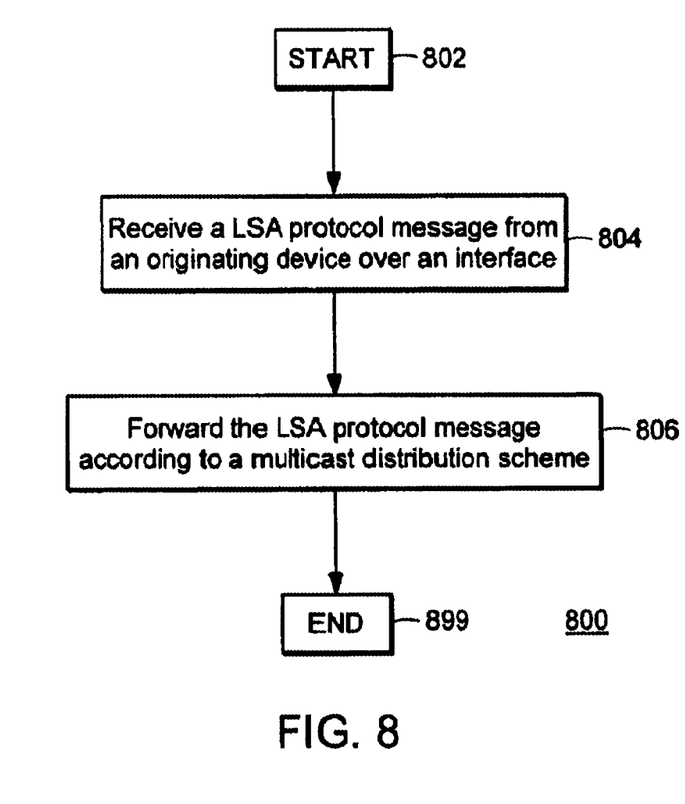
FIG. 8 is a logic flow diagram showing exemplary logic for forwarding a LSA protocol message using a multicast distribution scheme in accordance with an embodiment of the present invention.

FIG. 8 shows exemplary logic 800 for forwarding LSA protocol messages by the fast path using a multicast distribution scheme. Beginning at step 802, and upon receiving a LSA protocol message from an originating device over an interface, in step 804, the logic forwards the LSA protocol message according to a multicast distribution scheme, in step 806. The logic 800 terminates in step 899.

Yet another exemplary fast path forwarding scheme employs unicasting techniques for forwarding LSA protocol messages. In such a fast path forwarding scheme, the originating device sends an individually-addressed LSA protocol message to each router. Each router forwards the individually-addressed LSA protocol messages by the fast, path according to unicast routes as it would any other individually-addressed protocol message. The unicast routes are determined using a unicast routing protocol.

Figure 9:
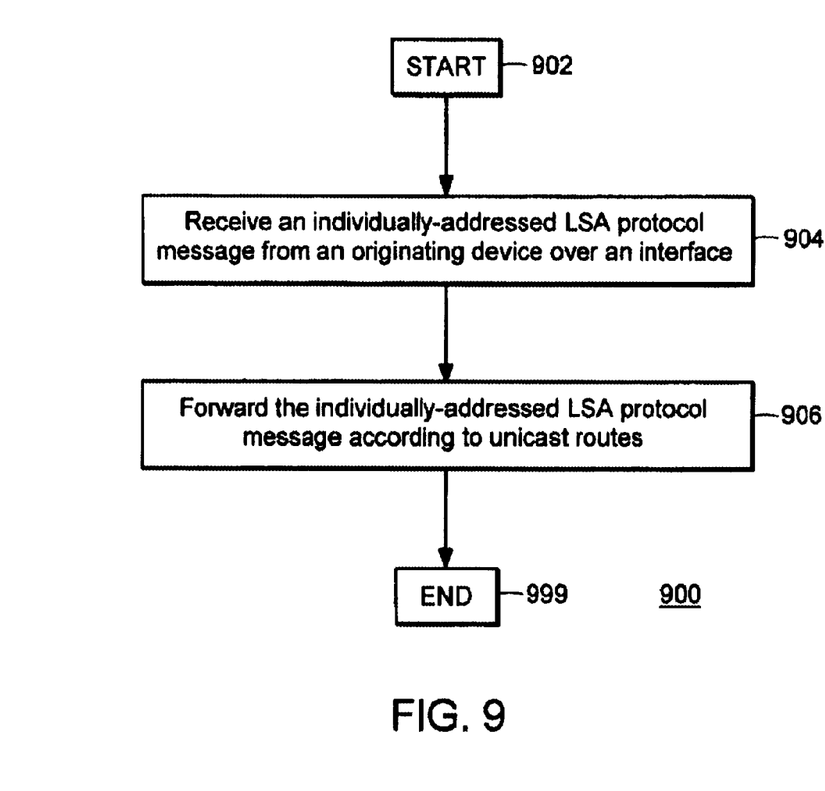
FIG. 9 is a logic flow diagram showing exemplary logic for forwarding a LSA protocol message using unicast routes in accordance with an embodiment of the present invention.

FIG. 9 shows exemplary logic 900 for forwarding LSA protocol messages by the fast path using unicast addressing. Beginning at step 902, and upon receiving an individually-addressed LSA protocol message from an originating device over an interface, in step 904, the logic forwards the individually-addressed LSA protocol message according to unicast routes, in step 906. The logic 900 terminates in step 999.

Of course, the exemplary fast path forwarding techniques described above are by no means exhaustive. It will be apparent to the skilled artisan that practically any forwarding scheme can be used to forward LSA protocol messages over the fast path. The present invention is not limited to any particular forwarding scheme, and is intended to encompass any such forwarding scheme.

In order for the fast path to forward LSA protocol messages, the fast path must be able to determine the rules for forwarding LSA protocol messages according to the predetermined forwarding scheme. Typically, a forwarding state is installed in the forwarding table indicating the rules for forwarding LSA protocol messages by the fast path. For convenience, such a forwarding state is referred to hereinafter as a LSA forwarding state. For example, the LSA forwarding state may indicate a preferred inbound interface for receiving LSA protocol messages or the outbound interface(s) to which LSA protocol messages are to be forwarded. Alternatively, the fast path may determine the rules for forwarding LSA protocol messages in real time.

Figure 10:
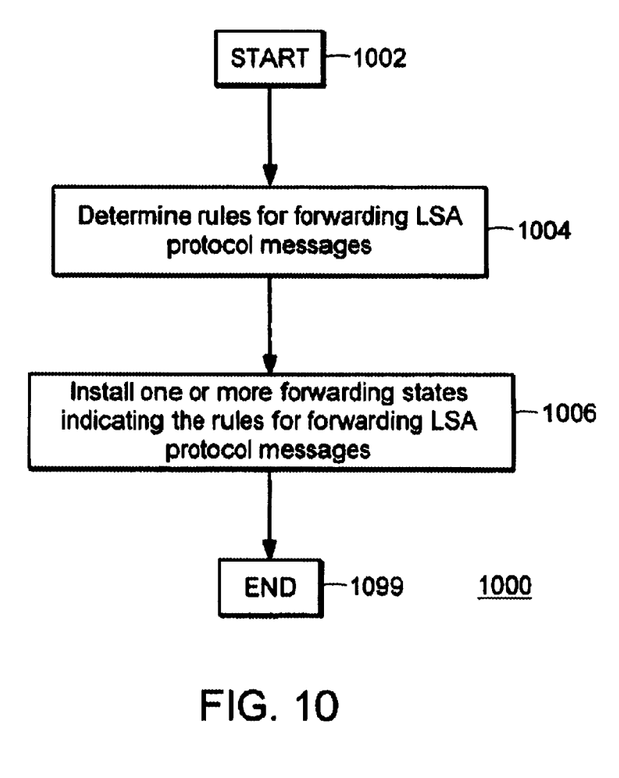
FIG. 10 is a logic flow diagram showing exemplary logic for installing LSA forwarding state(s) in accordance with an embodiment of the present invention.

FIG. 10 shows exemplary logic 1000 for installing LSA forwarding state(s). Beginning at step 1002, the logic determines the rules for forwarding LSA protocol messages, in step 1004, and installs one or more LSA forwarding states indicating the rules for forwarding LSA protocol messages, in step 1006. The logic 1000 terminates in step 1099.

Figure 11:
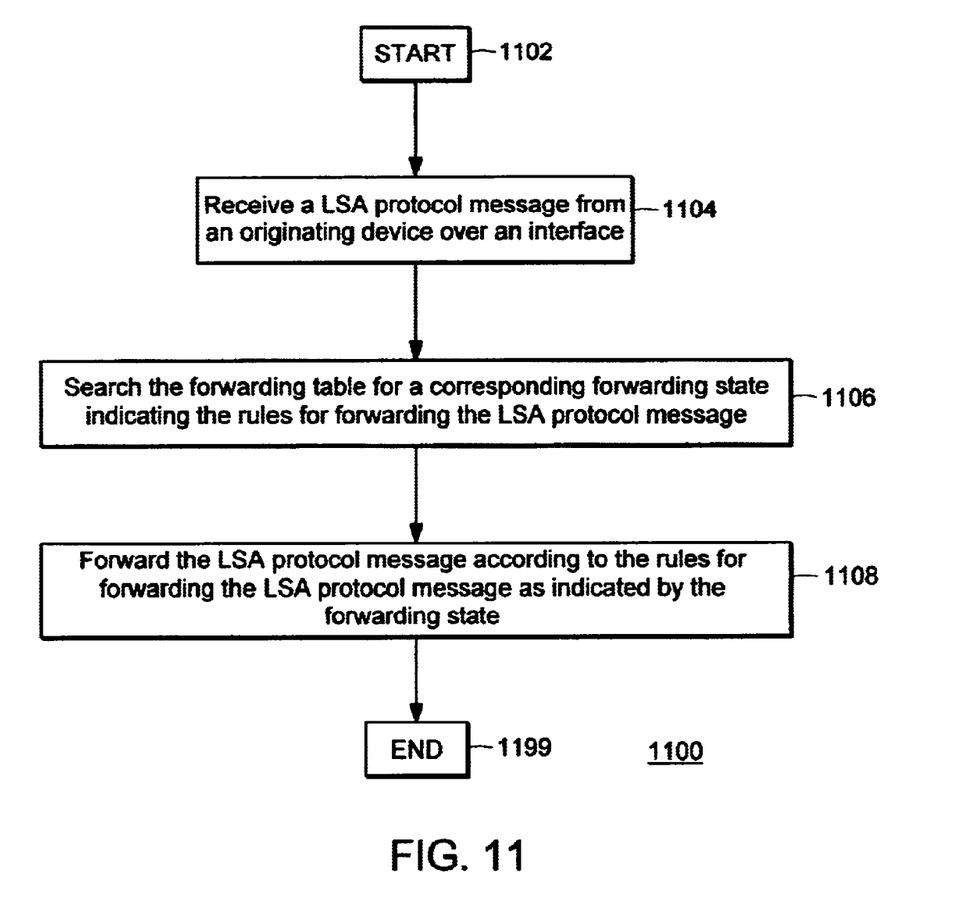
FIG. 11 is a logic flow diagram showing exemplary logic for processing a LSA protocol message according to a LSA forwarding state in accordance with an embodiment of the present invention.

FIG. 11 shows exemplary logic 1100 for processing a LSA protocol message according to a LSA forwarding state.

Beginning at step 1102, and upon receiving a LSA protocol message from an originating device over an interface, in step 1104, the logic searches the forwarding table for a corresponding forwarding state indicating the rules for forwarding the LSA protocol message, in step 1106. Upon finding such a forwarding state, the logic forwards the LSA protocol message according to the rules for forwarding the LSA protocol message as indicated by the forwarding state, in step 1108. The logic 1100 terminates in step 1199.

In a preferred embodiment of the present invention, predominantly all of the fast path forwarding logic is implemented as a set of computer program instructions that are stored in a computer readable medium and executed by an embedded microprocessor system within the router. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a; network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention may be embodied as a method for propagating a: link state advertisement protocol message by a network device in a communication network. The network device includes a fast path for forwarding protocol messages and a control plane for processing protocol messages. The method involves receiving a link state advertisement protocol message from an originating device over an inbound interface and forwarding the link state advertisement protocol message by the fast path according to a predetermined forwarding scheme. Forwarding the link state advertisement protocol message by the fast path according to the predetermined forwarding scheme may involve deciding to forward the link state advertisement protocol message by the fast path, for example, by determining that the inbound interface is a preferred inbound interface for the originating device; determining outbound interface(s) for forwarding the link state advertisement protocol message; and forwarding the link state advertisement protocol message by the fast path over the outbound interface(s). Forwarding the link state advertisement protocol message by the fast path may involve forwarding the link state advertisement protocol message to all interfaces other than the inbound interface. Forwarding the link state advertisement protocol message by the fast path may involve forwarding the link state advertisement protocol message by the fast path according to a multicast distribution scheme. Forwarding the link state advertisement protocol message by the fast path may involve forwarding the link state advertisement protocol message according to unicast routes. Forwarding the link state advertisement protocol message by the fast path may involve maintaining a forwarding state for the link state advertisement protocol message and forwarding the link state advertisement protocol message according to said forwarding state. The method preferably also involves routing the link state advertisement protocol message to the control plane, processing the link state advertisement protocol message by the control plane, and forwarding the link state advertisement protocol message by the control plane.

The present invention may also be embodied as a device for propagating a link state advertisement protocol message in a communication network. The device includes a plurality of interfaces, a control plane for processing protocol messages, and a fast path coupled to the control plane and to the plurality of interfaces. The fast path includes receiving logic for receiving a link state advertisement protocol message from an originating device over an inbound interface and fast path forwarding logic for forwarding the link state advertisement protocol message according to a predetermined forwarding scheme independently of any control plane processing of the link state advertisement protocol message. The fast path forwarding logic may include forwarding decision logic for deciding whether to forward the link state advertisement protocol message, for example, by determining whether the inbound interface is a preferred inbound interface for the originating device. The fast path forwarding logic may also include outbound interface determination logic for determining outbound interface(s) for forwarding the link state advertisement protocol message. The fast path forwarding logic may forward the link state advertisement protocol message to all interfaces other than the inbound interface. The fast path forwarding logic may forward the link state advertisement protocol message according to a multicast distribution scheme. The fast path forwarding logic may forward the link state advertisement protocol message according to unicast routes. The device typically includes a forwarding table having at least one forwarding state for the link state advertisement protocol message. The fast path forwarding logic may forward the link state advertisement protocol message according to said forwarding state. The fast path forwarding logic typically routes the link state advertisement protocol message to the control plane for local processing of the link state advertisement protocol message.

The present invention may also be embodied as a computer program product for use in a network device having a plurality of interfaces, a control plane for processing protocol messages, and a fast path for forwarding protocol messages. The computer program product includes receiving logic for receiving a link state advertisement protocol message from an originating device over an inbound interface and fast path forwarding logic for forwarding the link state advertisement protocol message according to a predetermined forwarding scheme independently of any control plane processing of the link state advertisement protocol message.

The present invention may also be embodied as a communication system for propagating a link state advertisement protocol message. The communication system includes a plurality of interconnected network devices. Each network device includes a control plane for processing protocol messages and a fast path for forwarding protocol messages. An originating device sends the link state advertisement protocol message to at least one other network device. The at least one other network device forwards the link state advertisement protocol message by the fast path according to a predetermined forwarding scheme independently of any control plane processing of the link state advertisement protocol message.

The present invention may be embodied in other specific forms without departing from the essence or essential characteristics. The described embodiments are to be considered in all respects only as illustrative and not restrictive.

I claim:

1. A method for propagating a link state advertisement protocol message by a network device in a communication network, the network device having a fast path for forwarding protocol messages and a control plane for processing protocol messages, the method comprising:
   receiving a link state advertisement protocol message from an originating device over an inbound interface; and
   forwarding the link state advertisement protocol message by the fast path according to a predetermined forwarding scheme independently of any control plane processing of the link state advertisement protocol message.

2. The method of claim 1, wherein forwarding the link state advertisement protocol message by the fast path according to the predetermined forwarding scheme comprises:
   deciding to forward the link state advertisement protocol message by the fast path;
   and determining outbound interface(s) for forwarding the link state advertisement protocol message; and
   forwarding the link state advertisement protocol message by the fast path over the outbound interface(s).

3. The method of claim 2, wherein deciding to forward the link state advertisement protocol message by the fast path comprises:
   determining that the inbound interface is a preferred inbound interface for the originating device.

4. The method of claim 1, wherein forwarding the link state advertisement protocol message by the fast path comprises:
   forwarding the link state advertisement protocol message to all interfaces other than the inbound interface.

5. The method of claim 1, wherein forwarding the link state advertisement protocol message by the fast path comprises:
   forwarding the link state advertisement protocol message by the fast path according to a multicast distribution scheme.

6. The method of claim 1, wherein maintaining the forwarding state for the link state advertisement protocol message comprises:
   determining rules for forwarding the link state advertisement protocol message; and
   installing a forwarding state in the forwarding table indicating the rules for forwarding the link state advertisement protocol message.

7. The method of claim 1, further comprising:
   routing the link state advertisement protocol message to the control plane; and
   processing the link state advertisement protocol message by the control plane.

8. The method of claim 7, further comprising:
   forwarding the link state advertisement protocol message by the control plane.

9. A device for propagating a link state advertisement protocol message in a communication network, the device comprising:
   a plurality of interfaces;
   a control plane for processing protocol messages; and
   a fast path coupled to the control plane and to the plurality of interfaces, the fast path comprising:
   receiving logic operably coupled to receive a link state advertisement protocol message from an originating device over an inbound interface; and
   fast path forwarding logic responsive to the receiving logic and operably coupled to forward the link state advertisement protocol message according to a predetermined forwarding scheme independently of any control plane processing of the link state advertisement protocol message.

10. The device of claim 9, wherein the fast path forwarding logic comprises:
    forwarding decision logic operably coupled to decide whether to forward the link state advertisement protocol message.

11. The device of claim 10, wherein the forwarding decision logic is operably coupled to determine whether the inbound interface is a preferred inbound interface for the originating device.

12. The device of claim 9, wherein the fast path forwarding logic comprises:
    outbound interface determination logic operably coupled to determine outbound interface(s) for forwarding the link state advertisement protocol message.

13. The device of claim 9, wherein the fast path forwarding logic is operably coupled to forward the link state advertisement protocol message to all interfaces other than the inbound interface.

14. The device of claim 9, wherein the fast path forwarding logic is operably coupled to forward the link state advertisement protocol message according to a multicast distribution scheme.

15. The device of claim 9, wherein the link state advertisement protocol message is an individually-addressed link state advertisement protocol message, and wherein the fast path forwarding logic is operably coupled to forward the link state advertisement protocol message according to unicast routes.

16. The device of claim 9, further comprising a forwarding table having at least one forwarding state for the link state advertisement protocol message.

17. The device of claim 16, wherein the fast path forwarding logic is operably coupled to forward the link state advertisement protocol message according to said forwarding state.

18. The device of claim 9, wherein the fast path forwarding logic is operably coupled to route the link state advertisement protocol message to the control plane for local processing of the link state advertisement protocol message.

19. The device of claim 18, wherein the control plane is operably coupled to forward the link state advertisement protocol message via the fast path.

20. A program product comprising a computer readable medium having embodied therein a computer program for propagating a link state advertisement protocol message by a network device in a communication network, the network device having a plurality of interfaces, a control plane for processing protocol message, and a fast path for forwarding protocol messages, the computer program comprising:

receiving logic programmed to receive a link state advertisement protocol message from an originating device over an inbound interface; and fast path forwarding logic responsive to the receiving logic and programmed to forward the link state advertisement protocol message according to a predetermined forwarding scheme independently of any control plane processing of the link state advertisement protocol message.

21. The program product of claim 20, wherein the fast path forwarding logic comprises:

forwarding decision logic programmed to decide whether to forward the link state advertisement protocol message.

22. The program product of claim 21, wherein the forwarding decision logic is programmed to determine whether the inbound interface is a preferred inbound interface for the originating device.

23. The program product of claim 20, wherein the fast path forwarding logic comprises:

outbound interface determination logic programmed to determine outbound interface(s) for forwarding the link state advertisement protocol message.

24. The program product of claim 20, wherein the fast path forwarding logic is programmed to forward the link state advertisement protocol message to all interfaces other than the inbound interface.

25. The program product of claim 20, wherein the fast path forwarding logic is programmed to forward the link state advertisement protocol message according to a multicast distribution scheme.

26. The program product of claim 20, wherein the fast path forwarding logic is programmed to route the link state advertisement protocol message to the control plane for local processing of the link state advertisement protocol message.

* * * * *

UNITED STATES PATENT AND TRADEMARK OFFICE
CERTIFICATE OF CORRECTION

| | | |
|---|---|---|
| PATENT NO. | : 6,928,483 B1 | |
| APPLICATION NO. | : 09/458402 | |
| DATED | : August 9, 2005 | |
| INVENTOR(S) | : Cain | |

It is certified that error appears in the above-identified patent and that said Letters Patent is hereby corrected as shown below:

At column 9, line 32, delete "[and]"

At column 9, line 34, after protocol message, insert, <u>from an originating device over an inbound interface; forwarding the link state advertisement protocol message to both the control plane for processing and to the fast path forwarding</u> by the fast path according to a predetermined forwarding scheme <u>in parallel but</u> independently of any control plane processing of the link state advertisement protocol message [.] <u>, wherein the link state advertisement protocol message is an individually-addresses link state advertisement protocol message, and wherein forwarding the link state advertisement protocol message by the fast path comprises:
forwarding the link state advertisement protocol message according to unicast routes, wherein forwarding the link state advertisement protocol message by the fast path comprise: maintaining a forwarding state for the link state advertisement protocol message based on the forwarding state.</u>

At column 10, line 18, after a control plane for processing messages [;] insert <u>including the link state advertisement protocol message;</u> and a fast path ---

At column 10, line 24, after device over an inbound interface [;] <u>, the receiving logic forwarding the link state advertisement protocol message to both the control plane and the fast path;</u> and fast path ---

At column 10, lines 28 on, termined forwarding scheme <u>in parallel with but</u> independently of any control plane processing of the link state advertisement protocol message [.] <u>, wherein the link state advertisement protocol message is an individually-addresses link state advertisement protocol message, and wherein forwarding the link state advertisement protocol message by the fast path comprises:
 forwarding the link state advertisement protocol message according to unicast routes, wherein forwarding the link state advertisement protocol message by the fast path comprises;
 maintaining a forwarding state for the link state advertisement protocol message; forwarding the link state advertisement protocol message based on the forwarding state.</u>

Col. 10, line 62
Claim 17, should read --claim 15.

UNITED STATES PATENT AND TRADEMARK OFFICE
CERTIFICATE OF CORRECTION

PATENT NO. : 6,928,483 B1
APPLICATION NO. : 09/458402
DATED : August 9, 2005
INVENTOR(S) : Cain

It is certified that error appears in the above-identified patent and that said Letters Patent is hereby corrected as shown below:

At column 11, line 15 on, over an inbound interface [;] and forward the link state advertisement protocol message from an originating device over an inbound interface and forward the link state advertisement protocol message to both the control plane for processing and to the fast path; and fast path forwarding logic response to the receiving logic and programmed to forward the link state advertisement protocol message according to a predetermined forwarding scheme in parallel with but independently of any control plane processing of the link state advertisement protocol message. Wherein the link state advertisement protocol message is an individually-addresses link state advertisement protocol message, and wherein forwarding the link state advertisement protocol message by the fast path comprises:
forwarding the link state advertisement protocol message according to unicast routes. Wherein the network device includes a forwarding table having at least one forwarding state for the link state advertisement protocol message, and wherein the fast path forwarding logic is programmed to forward the link state advertisement protocol message according to said forwarding state.

Col. 12, line 20
Claim 30 should read --claim 26.

Signed and Sealed this

First Day of August, 2006

JON W. DUDAS
*Director of the United States Patent and Trademark Office*